United States Patent [19]

Takei

[11] 4,402,017
[45] Aug. 30, 1983

[54] OPTICAL SCANNING SYSTEM UTILIZING LIGHT-EMITTING DIODES

[75] Inventor: Hideaki Takei, Tokyo, Japan

[73] Assignee: Xerox Corporation, Stamford, Conn.

[21] Appl. No.: 304,462

[22] Filed: Sep. 22, 1981

[30] Foreign Application Priority Data

Oct. 3, 1980 [JP] Japan .................. 55-140446

[51] Int. Cl.³ .................................. H04N 1/12
[52] U.S. Cl. .................. 358/293; 350/96.31; 358/294
[58] Field of Search .................. 358/293, 294; 350/96.31

[56] References Cited

U.S. PATENT DOCUMENTS

| 3,603,730 | 9/1971 | Weigl | 358/294 |
| 3,610,824 | 10/1971 | Hansen et al. | 358/286 |
| 3,658,407 | 4/1972 | Kitano | 350/96.31 |
| 3,967,893 | 7/1976 | Majewicz | 355/4 |
| 4,112,469 | 9/1978 | Paranjpe et al. | 358/296 |
| 4,179,621 | 12/1979 | Crean et al. | 250/566 |
| 4,317,137 | 2/1982 | Tompkins | 358/293 |
| 4,321,630 | 3/1982 | Kramer | 358/294 |

OTHER PUBLICATIONS

"Solid State Electric Imaging Device", John E. Gosztyla, Xerox Disclosure Journal, vol. 5, No. 6, Nov./Dec. 1980, p. 645.

"Gradient-Index Optics: A Review", Duncan T. Moore, Applied Optics, vol. 19, No. 7, Apr. 1, 1980, pp. 1035-1038.

Primary Examiner—Howard Britton

[57] ABSTRACT

A compact optical scanning system is provided to scan the information content of a document and generate electrical signals representative of the information content thereof. A light emitting linear array is used as an illumination source and a linear imaging device is positioned so as to focus the emitted light as a scanning line onto the document. In one embodiment, the document is moved through a scanning zone and light reflected from scanned lines is collected and converted into electrical signals which can be used to control a remote recorder device.

1 Claim, 3 Drawing Figures

OPTICAL SCANNING SYSTEM UTILIZING LIGHT-EMITTING DIODES

BACKGROUND AND PRIOR ART STATEMENT

This invention relates to an optical scanning system which scans an original document and converts scanned information into electrical signals and, more specifically, to an optical system which focuses light from a light emitting diode array via a gradient index lens array onto a document scan line.

A variety of prior art scanning systems have been used to scan a document and electronically capture reflected signals therefrom. The signals are then be used to control various types of print mechanisms such as facsimile transceivers and ink jet or thermal recorders. For example U.S. Pat. No. 3,610,824 discloses a facsimile system wherein a document is scanned by a rotating turret scan assembly, the reflected information content being collected and translated into electrical signals by a photosensing element. The signals from the light collector are then used to control operation of a recorder. U.S. Pat. Nos. 4,179,621 and 4,112,469 disclose raster scanning systems which utilize a plurality of solid state sensors to detect scanned information. The sensor array generates signals which can be stored or sent to remote locations to operate appropriate recording devices.

These prior art systems require sophisticated and costly optical components which require large areas for emplacement. The systems also require that the components be arranged along a fairly long optical path adding to the space requirements.

The present invention is directed to a scanning system which is small in size and comparatively simple in construction. The invention relates to an optical scanning system for scanning an original document lying in an object plane and generating electrical signals representative thereof, the system comprising an optical assembly consisting of a light emitting linear array spaced apart from, and parallel to said document, means to selectively activate said light emitting array to produce a band of radiation directed towards said document, a gradient index lens placed between said light emitting array and document, said lens array adapted to focus said illumination band as a narrow scan line on said document, light detecting means adjacent said scanned line to collect reflected light and generate a signal representative of the scanned information and means to produce relative movement between said optical assembly and said document.

DRAWINGS

DESCRIPTION

Figure 1:
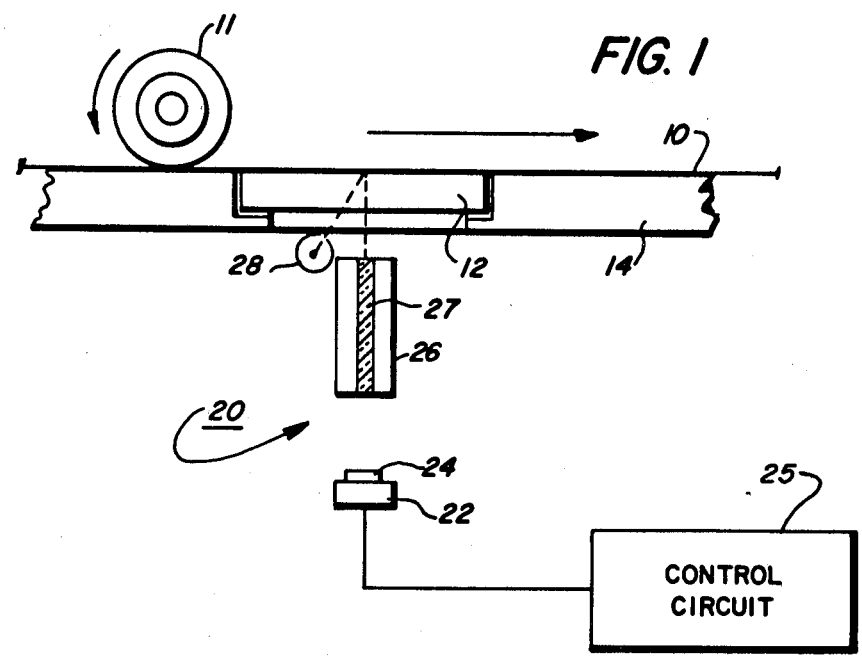
FIG. 1 is a first embodiment of the invention illustrating scanning of a moving document.

Referring now to FIG. 1, there is shown an optical scanning system for scanning the information content of a document 10 which is moved by roller 11 past an exposure window 12 set into a stationary document platen 14. Optical scanning assembly 20 consisrs of light-emitting linear array 22. Array 22 comprises a plurality of light emitting elements 24 arranged uniformly in a construction extending in the longitudinal direction (into the page) on a plurality of substrates, the entire array assuming a rectangular configuration of sufficient length to provide the scanning illumination for the width of document 10. The array is activated by application of suitable control potentials from control circuit 25. The general operation and construction of these arrays is well known and is discussed in "Electronic Design" Sept. 27, 1966, at page 67 et seq. and in U.S. Pat. No. 3,967,893.

A linear imaging array 26, is positioned above light-emitting array 22 so as to focus light emitted therefrom as a narrow scan line on document 10. Array 26 is a gradient index lens array and comprises a plurality of gradient index fibers 27 bound together in a staggered two row configuration. Details of suitable gradient index lens arrays, produced by Nippon Sheet Glass Co., Ltd., under the trade name SELFOC, are described in U.S. Pat. No. 3,658,407 and in an article by Duncan T. Moore in "Applied Optics", Vol. 19, No. 7, Apr. 1, 1980, pp. 1035–1038. These publications provide teachings relating to appropriate lens parameter, conjugate distance, etc.. While a gradient index lens array is preferred as the imaging member, other linear imaging devices such as strip lenses may be appropriate for some applications.

Light collector 28 is placed beneath exposure window and in a position to capture light reflected from the scanned segment of the document. Collector 28 may be of the type disclosed in either of copending U.S. application Ser. Nos. 257,694 or 183,134, now U.S. Pat. No. 4,321,630, assigned to the same assignee as the present invention.

In operation, document 10 is moved past exposure window 12 by roller 11, which can be driven by appropriate motor means (not shown). Light-emitting array 22 is activated and a narrow band of light from elements 24 is focused by lens array 26 through window 12 onto document 10. A portion of the light reflected from the scan line is collected by detector 28 which generates an output signal which can then be used to drive the desired recording assembly, i.e. ink jet printer, facsimile, etc.. For some systems, a second light collector 28 may be provided on the opposite side of array 26 and the two outputs summed, as is known in the art.

Figure 2:
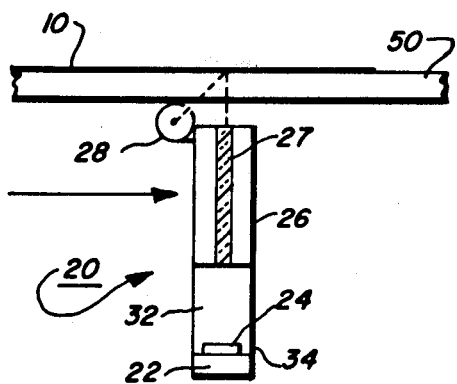
FIG. 2 is a second embodiment wherein the document is in a fixed location and the scanning assembly is moved.

Assembly 20 may consist of elements separate from each other and fixed in place, as shown in FIG. 1, or may be an integral assembly of the type shown in FIG. 2. FIG. 2 shows an alternate embodiment of the invention wherein the document is placed on fixed transparent platen 50 and assembly 20 is moved in a parallel path beneath the platen to produce the line-by-line scanning. In this embodiment, array 22 is attached to the bottom of array 26 by side walls 32, 34. Light collector 28 is attached to a strip 38 attached to the upper end of array 26. Assembly 20 is then moved parallel to the platen and the operation is as described above.

Figure 3:
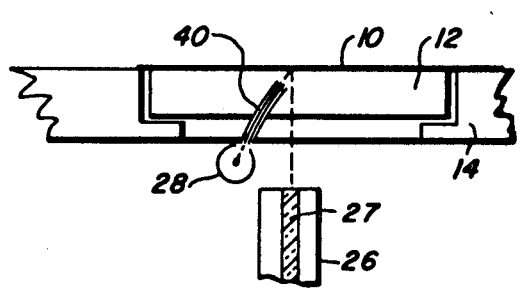
FIG. 3 is a modification of the FIG. 1 embodiment.

FIG. 3 shows a modification of the FIG. 1 embodiment wherein light collection from the scanned area is improved by placing an optical fiber light guide 40 between the scanned line and collector 28. The light collection can also be enhanced to meet particular system requirements, by adding a second collector to the opposite side of array 26. An alternative type of collector, such as that disclosed in U.S. Pat. No. 3,603,730 may also be utilized for any of the embodiments.

From the above description, it is evident that a very compact scanning system is enabled. The entire vertical distance, by virtue of the short conjugate length of lens array 26, will typically be less then 100 mm. The scanning assembly can be formed as one assembly, greatly simplifying handling and final location. The required components are relatively inexpensive compared to the requirements dictatated by the laser scan and solid state scanning systems.

I claim:

1. An optical scanning system for scanning an original document lying on a transparent substrate and for generating electrical signals representative thereof, the system comprising an optical assembly including a light-emitting linear array spaced apart from, and parallel to said document, means to selectively activate said light emitting array to produce a band of radiation directed towards said document, a linear lens array placed between said light emitting array and document, said lens array adapted to focus said illumination band as a narrow scan line on said document, light detecting means adjacent said substrate to collect reflected light and generate a signal representative of the scanned information, means to produce relative movement between said optical assembly and said document and further including fiber optic guide means positioned between said scanned line and said collector and formed as part of said substrate.

* * * * *